US008978335B2

(12) United States Patent
Kiefel et al.

(10) Patent No.: US 8,978,335 B2
(45) Date of Patent: Mar. 17, 2015

(54) PANEL FOR MECHANICAL CONNECTION WITH A FURTHER PANEL BY MEANS OF PIVOTING

(75) Inventors: Heinz Kiefel, Eging (DE); Franz Schrattenecker, Lohnsburg (AT)

(73) Assignee: tilo GmbH, Lohnsburg (AT)

( * ) Notice: Subject to any disclaimer, the term of this patent is extended or adjusted under 35 U.S.C. 154(b) by 597 days.

(21) Appl. No.: 12/066,115

(22) PCT Filed: Sep. 4, 2006

(86) PCT No.: PCT/EP2006/008604
§ 371 (c)(1),
(2), (4) Date: Apr. 11, 2008

(87) PCT Pub. No.: WO2007/028560
PCT Pub. Date: Mar. 15, 2007

(65) Prior Publication Data
US 2008/0245020 A1    Oct. 9, 2008

(30) Foreign Application Priority Data

Sep. 7, 2005  (DE) ...................... 20 2005 014 132 U

(51) Int. Cl.
*E04F 13/08*    (2006.01)
*E04B 1/62*    (2006.01)
(Continued)

(52) U.S. Cl.
CPC ................ *E04F 13/08* (2013.01); *E04F 15/02* (2013.01); *E04F 2201/0153* (2013.01); *E04F 2201/027* (2013.01)
USPC ............. 52/588.1; 52/392; 52/586.1; 52/395; 52/592.1; 52/592.2; 403/292; 403/294; 403/298; 403/364; 403/381

(58) Field of Classification Search
USPC .................. 52/392, 586.1, 395, 592.1, 592.2; 403/292, 294, 298, 364, 381
See application file for complete search history.

(56) References Cited

U.S. PATENT DOCUMENTS 6,006,486 A * 12/1999 Moriau et al. ............... 52/589.1
(Continued)

FOREIGN PATENT DOCUMENTS

| EP | 1 283 313 A | 2/2003 |
| EP | 1 380 710 A2 | 1/2004 |

(Continued)

*Primary Examiner* — Brian Glessner
*Assistant Examiner* — Omar Hijaz
(74) *Attorney, Agent, or Firm* — Bachman & LaPointe, PC

(57) ABSTRACT

The invention relates to a panel designed for mechanical connection with at least one further, identical panel by means of pivoting, with a tongue and groove profile (6, 8) for fastening the panels (2, 4) at the same height with respect to one another, comprising a groove profile (6) with a short groove cheek (14), a groove bottom (16) and a long groove cheek (18) on at least one side of the panel and a tongue profile (8) corresponding to the groove profile (6) on at least one side of the panel, wherein the long groove cheek (18) has a greater thickness (M) at its free end (20) than in the region under the free end of the short groove cheek (14), and wherein in the assembled state the tongue and groove each have upper bearing faces (24*a*, 24*b*), which are inclined with respect to the surface (10) of the panel (2, 4), and lower bearing faces (26*a*, 26*b*) which are rounded, and with locking means (28*a*, 28*b*) for fastening the panels (2, 4) in the same plane with respect to one another, comprising a locking face (28*b*) on the tongue and a locking face (28*a*) on the groove, wherein the locking faces (28*a, b*) on the groove and on the tongue are arranged between the surfaces (10, 12) of the panels (2, 4) in the region of the free end (20) of the long groove cheek (18). To make it possible for the panels to be assembled without deformation and jamming, and thereby avoiding damage during the laying operation, provision is made for the height H of the locking faces (28*a*, 28*b*) not to be more than 20% of the maximum height M of the long groove cheek (18).

7 Claims, 2 Drawing Sheets

(51) Int. Cl.
*E04B 2/00* (2006.01)
*F16B 7/00* (2006.01)
*E04B 1/26* (2006.01)
*B23Q 1/48* (2006.01)
*E04F 15/02* (2006.01)

(56) References Cited

U.S. PATENT DOCUMENTS 7,168,217 B2 * 1/2007 Weber .......................... 52/592.1
7,251,916 B2 * 8/2007 Konzelmann et al. ........ 52/592.1
7,451,578 B2 * 11/2008 Hannig ......................... 52/586.1
7,484,337 B2 * 2/2009 Hecht ............................ 52/578
7,516,588 B2 * 4/2009 Pervan .......................... 52/592.1
7,624,552 B2 * 12/2009 Thiers et al. ................. 52/403.1

FOREIGN PATENT DOCUMENTS

WO        97/47834 A      12/1997
WO        01/77461 A      10/2001
WO     2004/079130 A       9/2004

* cited by examiner

PANEL FOR MECHANICAL CONNECTION WITH A FURTHER PANEL BY MEANS OF PIVOTING

BACKGROUND OF THE INVENTION

The present invention relates to a panel of wood or wood material for connection with other like panels, in particular to create wall, ceiling or floor surfaces.

Such panels are well known. They have at least two profiled edges, a first edge being provided with a groove profile, and a second edge with a corresponding tongue profile. Tongue and groove profiles fix two panels at the same height. In addition, the panels have locking means for fixing two panels in the same plane, i.e. to prevent the panels from being detached from each other by pulling. Displacement of the panels parallel to each other is still possible as a rule. The panels thus prepared, according to a first embodiment, are provided as so-called click panels having a profile which is configured as a detent connection. According to a second embodiment which is part of the subject matter of the present invention, such panels are connected with each other by pivoting.

The panel described in DE 100 21 897 (Hornitex) can be regarded as generic state of the art in view of the present invention. However, it has been shown in practice, that the tongue and groove profile with a non-positive engagement (where forces are acting) leads to the panel being split in the area of the groove bottom when the panels are joined. The clamping force created at the contact surfaces of the locking means reinforces the splitting tendency in the area of the groove bottom on the one hand. On the other hand, shearing forces are built up toward the free end of the long groove cheek including the contact surface.

SUMMARY OF THE INVENTION

It is therefore an object of the present invention to provide a panel suitable for mechanical connection with another like panel, wherein it is ensured that there is no damage during installation.

The panel according to the present invention includes features with respect to the groove and tongue profile and the locking means, which are well known. It is configured for mechanical connection with at least one further like panel by pivoting. The tongue and groove profile is for fixing the panels at the same height with respect to each other. The groove profile has a short groove cheek, a groove bottom and a long groove cheek on at least one side of the panel, whereby the long groove cheek has a larger thickness at its free end than in the area of the groove bottom. A tongue profile corresponding to the groove profile is formed on at least one further side of the panel, wherein the groove and the tongue, in the joined state, each have upper bearing faces inclined with respect to the surface of the panel, and lower bearing faces, which are rounded.

The locking means are for fixing the panels in the same plane with respect to each other. They have a locking face on the tongue and a locking face on the groove, whereby the locking faces on the groove and the tongue are arranged between the surfaces of the panel in the area of the groove bottom. The surfaces of the panel are the top surface and the bottom surface of the panel, the profiles and locking means each being arranged on the narrow sides of the panel.

The essential feature for the prevention of damage on the panel during installation, in particular for the prevention of splitting in the area of the groove bottom, is the formation of the groove and the tongue as positively engaging elements in the area of the bearing faces, rather than as clamping surfaces. The idea on which the present invention is based shows that the tongue and groove only define the profile with respect to the definition of the height of the panels. Herein it is disadvantageous if the groove and tongue are in clamping engagement because the definition of the height is not precise due to the splitting tendency. It is quite sufficient if the groove and tongue are in engagement with each other without causing any deformation.

The same applies to the locking means. In this case also, the risk of thrust stresses was reduced in order to minimize or even eliminate the tendency to crack formation. The essential feature is that the height H of the locking surfaces is not more than 20% of the maximum height M of the long groove cheek. Trials have shown that a profile with a small height of the securing faces can be manufactured in a particularly economical way. It must be noted as a particular advantage that with a small height of the locking faces there is a low tendency for the panel to split. With respect to the maximum height M of the long groove cheek, the height H of the locking face is not more than 15%, preferably not more than 12% according to the present invention. As a result only a small amount of material needs to be taken out of the long groove cheek—and correspondingly out of the profile on the tongue side—to form the locking means. This saves tools and facilitates a stable profile because the free end of the long groove cheek is thicker than before due to the smaller material loss according to the present invention.

Furthermore it is essential that the top face of the long groove cheek is obliquely arranged in sections at least with respect to the top surface of the panel. It has been found advantageous, if the top face of the long groove cheek is at an angle $\epsilon$ at least in sections which is flatter than angle $\delta$. Angle $\epsilon$ in particular is smaller than 10°, it is preferably up to 7°, particularly preferably up to 5°. Generally speaking according to an advantageous embodiment of the invention angle $\epsilon$ is about half of angle $\delta$.

A further advantageous feature for preventing splitting of the joint panels or splitting during installation of the panels is the provision of free spaces between the free end of the long groove cheek and the tongue with the exception of the securing faces. A first free space is provided on the one hand between the tongue and the bottom groove cheek. It extends from the bottom bearing face as far as the securing face. The free space is, on the one hand, for receiving dust and dirt which cannot be wholly eliminated during installation. On the other hand, it compensates manufacturing deviations occurring during manufacture of the profile. A second free space begins at the top end of the bearing faces and extends between the panel provided with the groove profile and the panel provided with the tongue profile. Again, this provides a space for receiving dirt. The free space also ensures that controlled and predictable conditions are created with two joined panels which only contact each other in the area of the bearing faces and the locking faces. Finally, it has been found as a particular advantage that the free spaces have a compensating effect when the panels are installed on a base or backing which is not completely planar. Due to minimal deformations the profile is better able to adapt to uneven bases or backings which are quite frequent when panels have to be installed in old buildings.

Another embodiment of the profile according to the present invention has also been found advantageous. The angle between the locking face of the groove profile and the face of the groove cheek extending adjacent to this securing face as far as the groove bottom, is as small as possible with prior art profiles, as a rule it is chosen to be about 90°. This is because persons skilled in the art are of the opinion that this makes the resistance against being pulled apart particularly high or that such a high gradient of the locking face is necessary to ensure efficient locking of the groove and tongue. According to the present invention it is suggested, however, that the angle γ be at least 125°, preferably 130°, particularly preferably 135°. In this range, pulling apart of joined panels in the plane in which they are installed, is not possible. The resistance against being pulled apart is optimized by minimizing the tendency of the wood or wood material to split in this part of the profile under tensile stress by providing the large angle β.

A further feature which has been found advantageous according to the present invention is to select the angle β between a connection of the top end of the locking surface on the groove profile with the end of the surface of the groove profile on the panel on the one hand and the extension of the locking face on the groove profile on the other hand, of at least 90°. Surprisingly, trials have shown that such a large angle β which angle β which can be as large as 95° or even 105°, still ensures efficient locking.

The locking face which is much more strongly inclined than previously, or the larger angle β, achieves two advantages. On the one hand, the opening of the groove is enlarged so that it is easier to insert the tongue. On the other hand, trials have shown that the resistance against being pulled apart of the profile according to the present invention, i.e. the force required for pulling apart two joined panels, is substantially higher for the configuration of the profile suggested according to the present invention than for profiles according to the prior art. This is because, with a larger angle β, the tendency for the groove cheek to split in the area of the locking surface is reduced.

Essential features for tool-saving processing of a profile having a small height of the locking faces is that the bearing face on the short groove cheek and a surface section limiting the free end of the long groove cheek toward the top surface of the panel are both oblique with respect to the top surface of the panel. Preferably, further sections of the top face of the long groove cheek are also oblique with respect to the top surface of the panel. In this case, one tool is sufficient, as a rule a mill, to machine the groove bottom and if necessary also the top face of the long groove cheek. Two tools are necessary for more deeply cut profiles since linear guiding of the tool as far as the groove bottom and from there up to the beginning of the locking face was not possible.

The bearing face on the short groove cheek and a surface section on the free end of the long groove cheek which is inclined toward the groove bottom, are at an angle δ of at least 5°, preferably of at least 10°, particularly preferably of at least 20° to the surface of the panel. This configuration of the bearing face on the short groove cheek—and therefore usually also of the corresponding bearing face on the tongue—and of the surface section at the free end of the long groove cheek which is inclined toward the groove bottom, at an angle δ of at least 5°, preferably, however, of more than 5°, enables tool-saving machining of the profile. The tool utilization is reduced because fewer tools are necessary for machining the profile than with prior art profiles, and because these tools also need to cut away less material so that wear and tear on the tools is minimized.

According to a particularly preferred embodiment, a profile of the present invention, with a four-side profile, can have two narrow sides with a groove profile, and two sides with a tongue profile. Such panels can be prepared completely ready for installation by forming the profile in the factory.

BRIEF DESCRIPTION OF THE DRAWINGS

Varying embodiments of the present invention will be described in detail in the following with reference to the example of FIG. 1. In the drawings.

DETAILED DESCRIPTION

Figure 1:
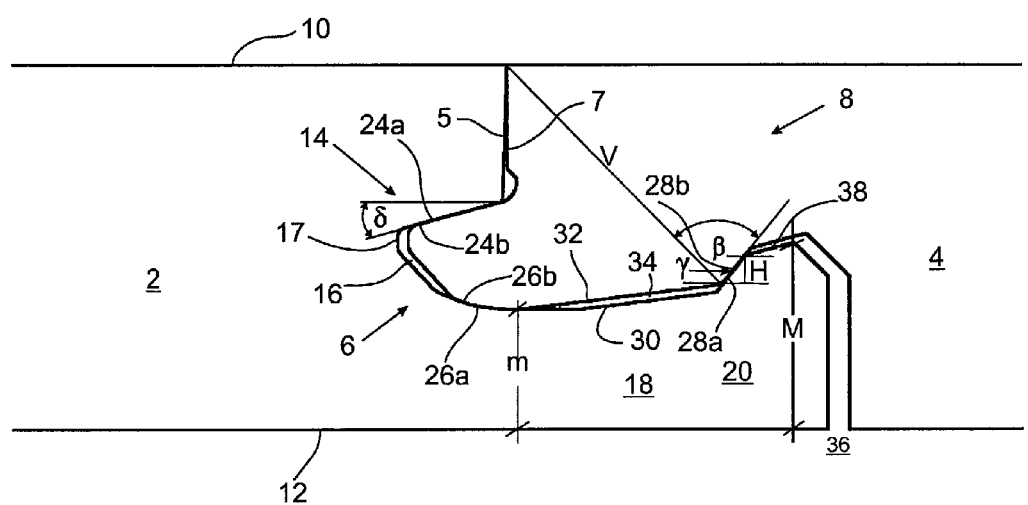
FIG. 1 is a sectional view of a profile according to the present invention (first embodiment)

FIG. 1 shows a panel 2 of a high-density fiber panel (HDF) having a groove profile 6 on a narrow side 5. The panel can also be made of solid wood. Panel 2 is in engagement with a second panel 4 having, on a narrow side 7, a corresponding tongue profile 8. Groove profile 6 is formed between top surface 10 and bottom surface 12 of the panel in a narrow side 5 of the high-density fiber panel, like tongue profile 8 on narrow side 7 of panel 4.

Groove profile 6 has a short groove cheek 14, a groove bottom 16 and a long groove cheek 18. Groove bottom 16 is formed with a base 17 which merges in a rounded shape, into groove cheeks 14 and 18 to avoid splitting stresses and to minimize the tendency to split when panels 2 and 4 are joined. Long groove cheek 18 extends from the groove bottom to a free end 20 not covered by short groove cheek 14. Free end 20 of long groove cheek 18 has a larger height M than in the area lying under the free end of short groove cheek 14 and which is designated as height m in FIG. 1.

In the joined state, as shown in FIG. 1, groove profile 6 and tongue profile 8 have top bearing faces 24a, 24b obliquely arranged with respect to top surface 10. Bottom bearing faces 26a, 26b are formed with a rounded shape making the insertion of the tongue into the groove easier.

By having longer groove cheek 18 rise from height m in the area below the free end of the short groove cheek to height M in the area of free end 20, a locking face 28a can be arranged in the area of this rise. A corresponding locking face 28b is arranged in the area of tongue profile 8. Height H of these locking faces 28a, 28b—with respect to height M of free end 20—with a profile according to FIG. 1, is 14%. Locking faces 28a, 28b are arranged between top surface 10 and bottom surface 12 of panels 2, 4 within the height of groove bottom 16.

Locking faces 28a, 28b are aligned in such a way that an extension of locking faces 28a, 28b with a connection line V extending from top surface 10 of panel 2 at the beginning of groove profile 6 to the top end of locking face 28a forms an angle β of 90°. Further, locking face 28 forms an angle γ of 135° with top face 30 of long groove cheek 18.

A free space 34 extends between locking faces 28a, 28b and bottom bearing faces 26a, 26b which is limited by top face 30 of long groove cheek 18 and by bottom side 32 of tongue profile 8. A free space 36 extends between the top end of locking faces 28a, 28b, tongue profile 8 and bottom surface 12 of panels 2, 4.

FIG. 1 further shows a feature of the groove profile allowing for tool-saving machining of a profile having a small height of the locking faces. Bearing face 24a on the short groove cheek and a surface section 38 limiting free end 20 of the long groove cheek toward top surface 10 of panel 2 are both arranged at an angle δ of 15° in an oblique position to top surface 10 of panel 2. Top face 30 of long groove cheek 18 and bottom face 32 of the tongue—with respect to top surface 10 of the panel—are also inclined. They are formed with a smaller angle than angle δ. Angle ε (see FIG. 2) of 7°, according to this preferred embodiment, is about half of angle δ. With this type of embodiment of the groove profile, one tool, a mill as a rule, is sufficient to machine groove bottom 16 and, if necessary, top side 30 of long groove cheek 18. Two tools are necessary for more deeply formed profiles since linear insertion of a single tool as far as groove bottom 16 and from there up to the beginning of locking face 28a is not possible.

Figure 2:
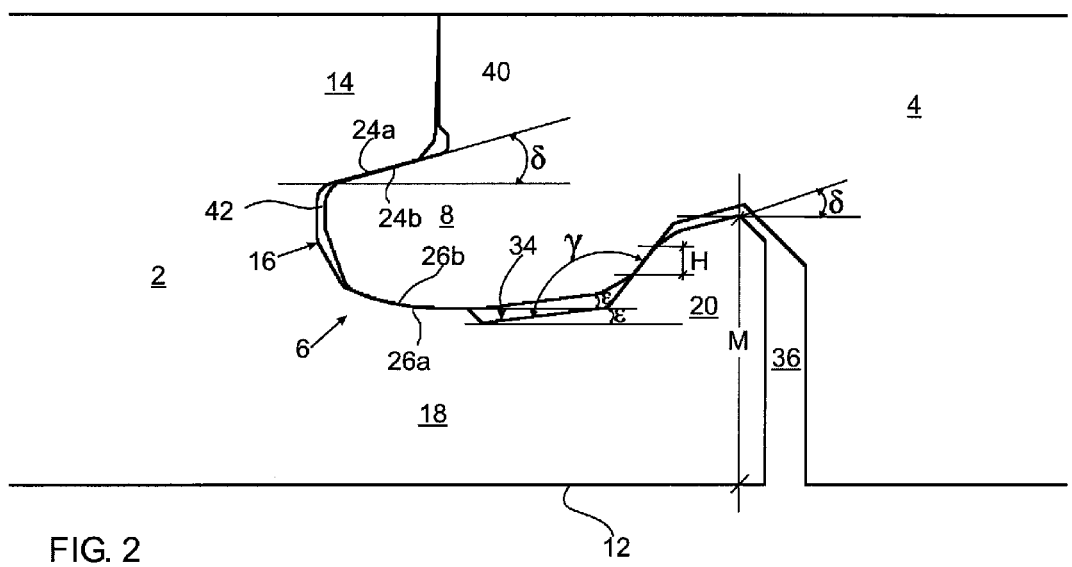
FIG. 2 is a sectional view of a profile according to the present invention (second embodiment).

FIG. 2 shows a spruce profile. The same reference numerals as in FIG. 1 also designate the same features. The spruce profile can be manufactured directly and exclusively of solid wood. However, usually the spruce wood is used as a core material, wherein the cover layer is of a different wood veneer, cork, linoleum or the like. As a counteracting layer, the bottom surface of the solid wood profile can be coated with strong paper which takes up deformation forces. Further, an impact sound insulation of plastic material, cork or felt, can also be provided on the bottom surface of the profile.

The ratio of height H of locking faces 28a, 28b, i.e. the height over which locking faces 28a, 28b contact each other, and height M, i.e. the maximum height of free end 20 of long groove cheek 18, is 11% in the exemplary embodiment according to FIG. 2. Angle δ is 15°. Angle γ is 133°. Angle ε is 7°. Free spaces 34 and 36 extend on both sides of locking surfaces 28a, 28b. Further free spaces 40 and 42 extend on both sides of top bearing faces 24a, 24b. Bottom bearing faces 26a, 26b are adjacent to free spaces 42 and 34. This is how the surfaces which determine the definition in the height and in the plane are unequivocally defined, and a positive engagement is achieved which does not cause, however, deformation of the profile during installation. The creation of splitting forces is avoided during installation.

The profile according to claim 2 of the present invention only needs little tool utilization. On the one hand, few tools are used, because the groove bottom, in particular, can be formed in one pass using one tool. On the other hand, the flat configuration of the overall profile only needs little material cutting. This is why the stresses on the tools are slight and wear and tear is correspondingly small. The results are extended tool life and little interference in the production for exchanging tools.

The small amount of cut-away material results in the long groove cheek 18 having stronger dimensions than before. It has been found as an additional, unexpected advantage that this groove cheek 18 is subject to less vibration already during manufacture by means of the milling tools so that the profile can be more precisely machined. Installation is thereby further simplified.

The invention claimed is:

1. A panel, prepared for mechanical connection with at least one further, like panel by pivoting, comprising:
    a groove and tongue profile (6, 8) for fixing the panels (2, 4) at the same height with respect to each other, said groove profile (6) having a short groove cheek (14), a groove bottom (16) and a long groove cheek (18) at least on one side of said panel, and said tongue profile (8) corresponding to the groove profile (6) on at least one side of said panel, wherein the long groove cheek (18), at its free end (20), has a greater thickness (M) than in the area under the free end of the short groove cheek (14), and wherein the groove and tongue in a joined state each have top bearing surfaces (24a, 24b) with respect to a top surface of the tongue profile which are inclined with respect to the top surface (10) of the panel (2, 4), and bottom bearing surfaces (26a, 26b) which are rounded,
    locking means (28a, 28b) for fixing said panels (2, 4) in the same plane with respect to each other, including a locking face (28b) on said tongue and a locking face (28a) on said groove, wherein the locking faces (28a, 28b) are arranged on said groove and on said tongue between said top surface (10) and a bottom surface (12) of said panels (2, 4) in the area of the groove bottom (16),
    wherein the height H of the locking faces (28a, 28b) is not more than 20% of the maximum height M of the long groove cheek (18), wherein at least sections of the top side (30) of the long groove check (18) are obliquely arranged, wherein the top bearing surfaces (24a, 24b) contact each other when said panels are fixed in the same plane with respect to each other, and wherein the bottom bearing surfaces (26a, 26b) contact each other when said panels are fixed in the same plane with respect to each other, and wherein, when the groove and tongue profile (6, 8) are moved from a non-engaged position to a positive engagement, no deformation of the groove and tongue profile (6, 8) occurs.

2. The panel according to claim 1, wherein at least sections of said top face (30) of said long groove cheek (18) are arranged at an angle (ε) which is up to 10° with respect to the top surface (10) of the panel (2).

3. The panel according to claim 1, wherein, with the exception of the locking faces (28a, 28b), free spaces (34, 36) are provided between the free end (20) of the long groove cheek (18) and the tongue.

4. The panel according to claim 1, wherein at least sections of said top face (30) of said long groove cheek (18) are arranged at an angle (ε) with respect to the top surface (10) of the panel (2) which is about half of angle δ taken between the top bearing surfaces (24a, 24b) and the top surface (10) of the panel (2).

5. The panel according to claim 2, wherein the angle (ε) is up to 7°.

6. The panel according to claim 2, wherein the angle (ε) is up to 5°.

7. The panel according to claim 1, wherein the height H of the locking faces (28a, 28b) is not more than 15% of the maximum height M of the long groove cheek (18).

* * * * *